United States Patent [19]

Crall

[11] Patent Number: 5,097,140
[45] Date of Patent: Mar. 17, 1992

[54] ALTERNATOR STARTER

[75] Inventor: Frederick W. Crall, Farmington Hills, Mich.

[73] Assignee: Chrysler Corporation, Highland Park, Mich.

[21] Appl. No.: 696,668

[22] Filed: May 7, 1991

[51] Int. Cl.$^5$ ............................................. H02P 11/00
[52] U.S. Cl. .................................. 290/36 R; 290/31; 290/46
[58] Field of Search ........................ 290/31, 36 R, 46

[56] References Cited

U.S. PATENT DOCUMENTS

| | | | |
|---|---|---|---|
| 1,250,718 | 12/1917 | Turbayne | 290/22 |
| 1,325,677 | 12/1919 | Midgley | 290/31 |
| 2,184,236 | 12/1939 | Heintz | 290/31 |
| 4,219,739 | 8/1980 | Greenwall | 290/46 |
| 4,862,009 | 8/1989 | King | 290/22 |
| 5,001,412 | 3/1991 | Carter et al. | 290/46 |

OTHER PUBLICATIONS

Jay. Frank, Editor, IEEE Standard Dictionary of Electrical and Electronics Terms, Third Edition, 1984, p. 405.

Primary Examiner—J. R. Scott
Assistant Examiner—Robert L. Hoover
Attorney, Agent, or Firm—Mark P. Calcaterra

[57] ABSTRACT

A combined starter motor and alternator for a vehicular engine system can be positioned for direct coupling to an engine power shaft between the engine and transmisson. A pair of axially offset magnetically permeable disks are bolted to the power shaft. These disks form an annular channel therebetween. A plurality of rare earth permanent magnets are mounted on the inside face of one of the disks in the channel. Positioned within the channel is a stationary, ironless stator assembly having stranded conductive wire windings embedded in an insulation matrix. These windings alternatively pass from the perimeter of the disk towards the interior of the disk as each winding forms a single pass around a longitudinal axis of the power shaft. In a starter mode of operation, a polarity sensor, such as a Hall-effect switch mounted adjacent each stator phase winding, is used to control the driver switches of a conventional H-type arrangement for providing drive current to a starter motor stator coil. The H-driver circuit features use of semiconductor switches capable of withstanding high reverse bias voltage in the H-legs extending between coil ends and the vehicle's battery or direct current energy source.

23 Claims, 8 Drawing Sheets

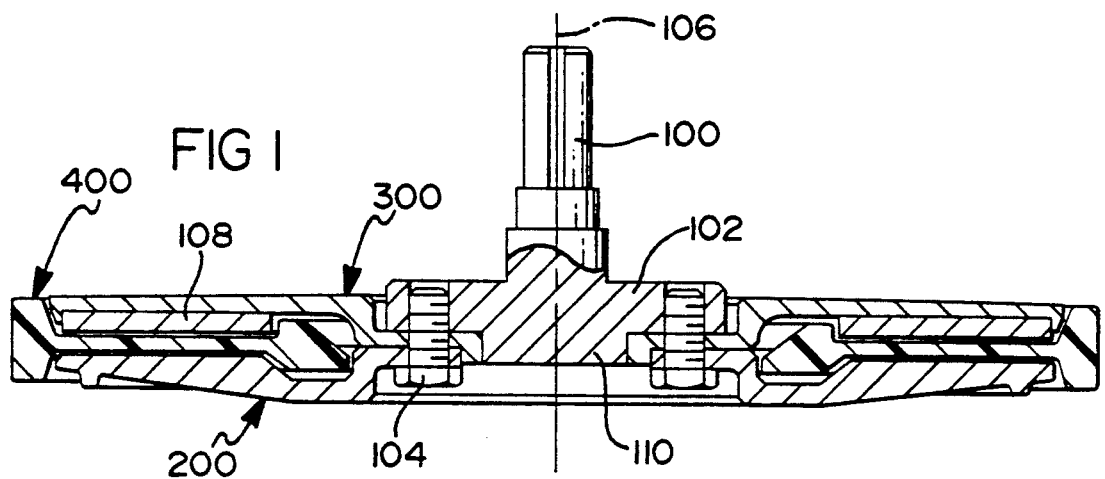
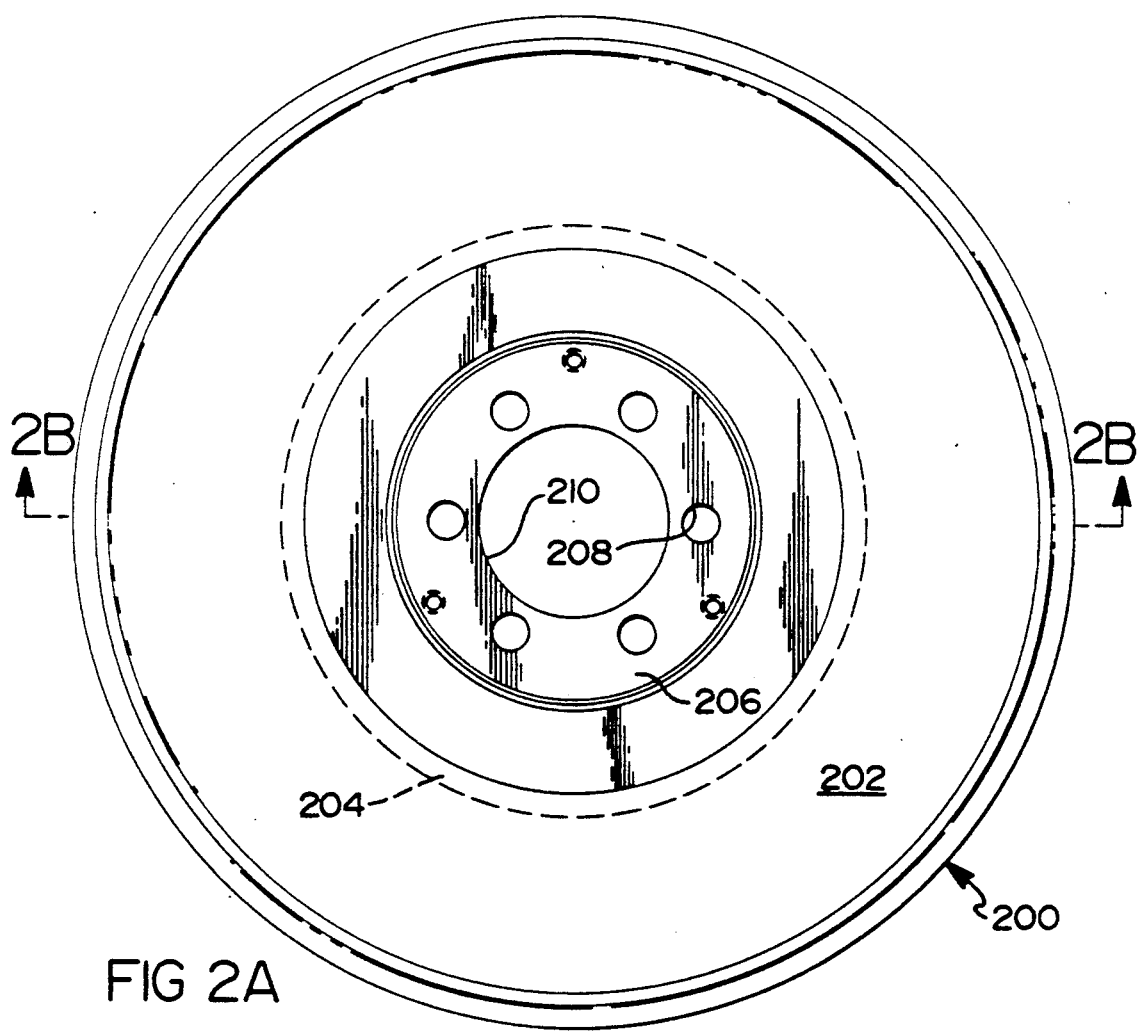

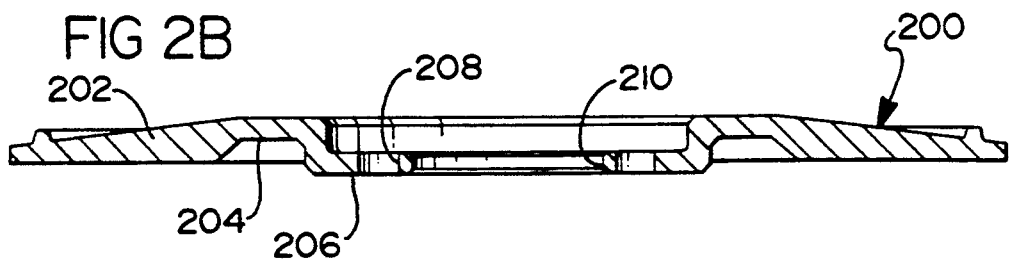
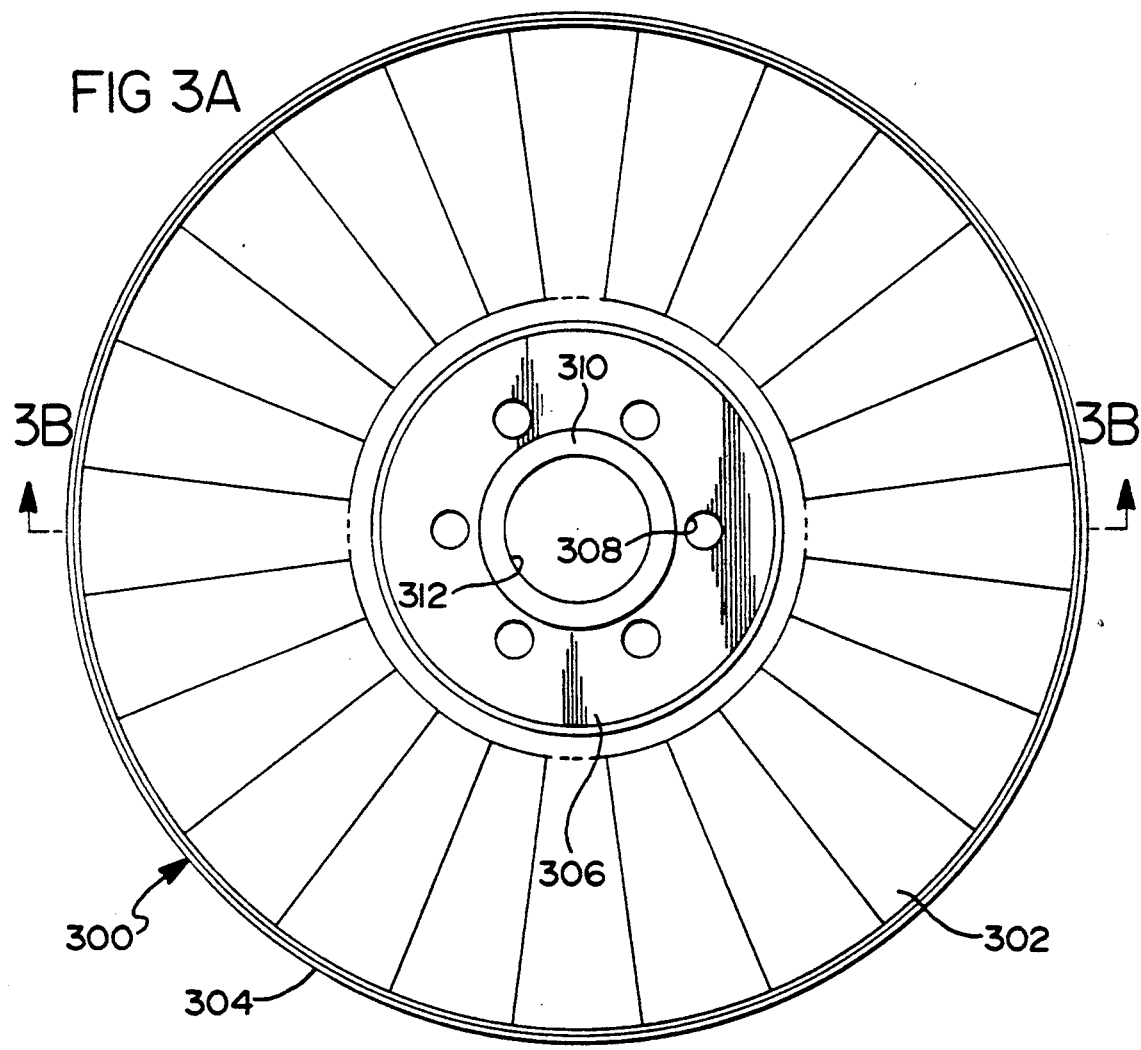
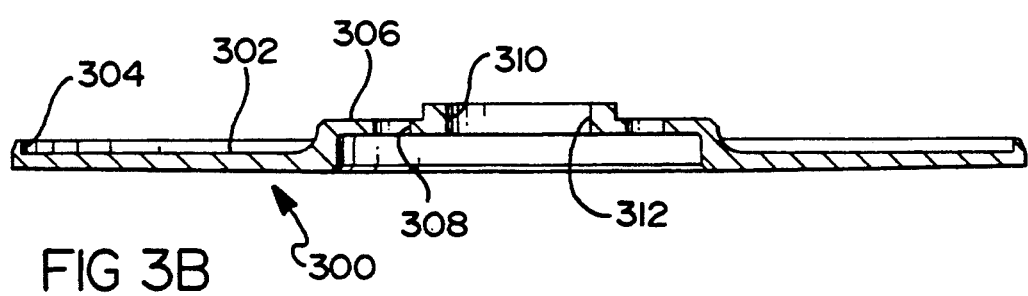

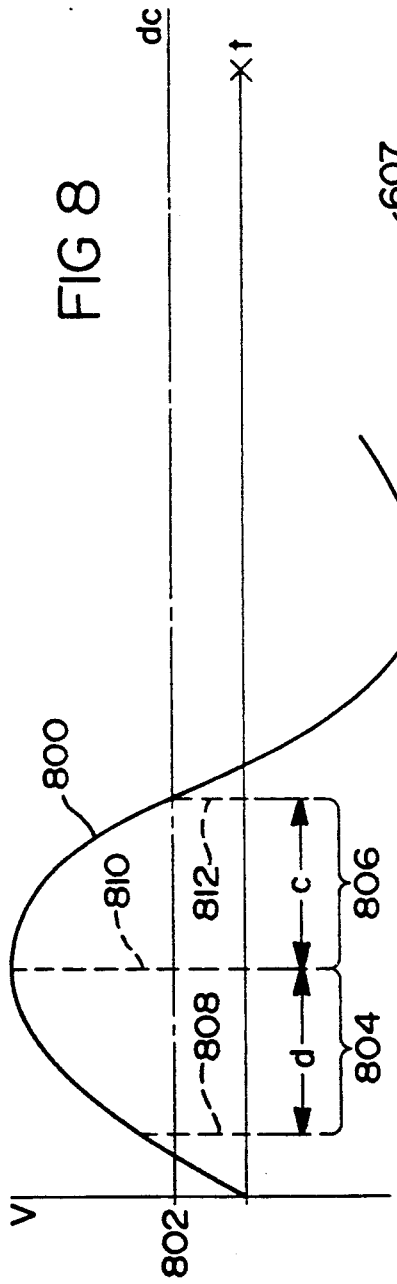
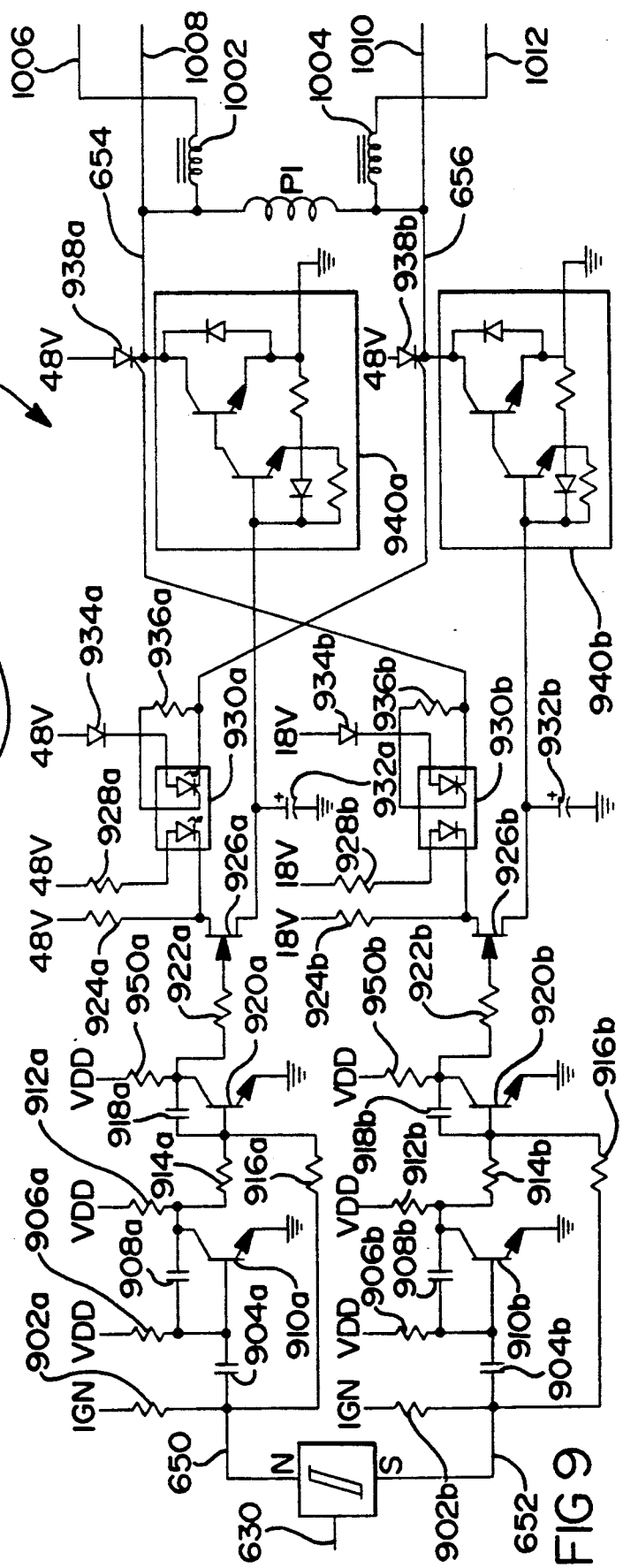
FIG 8
FIG 9

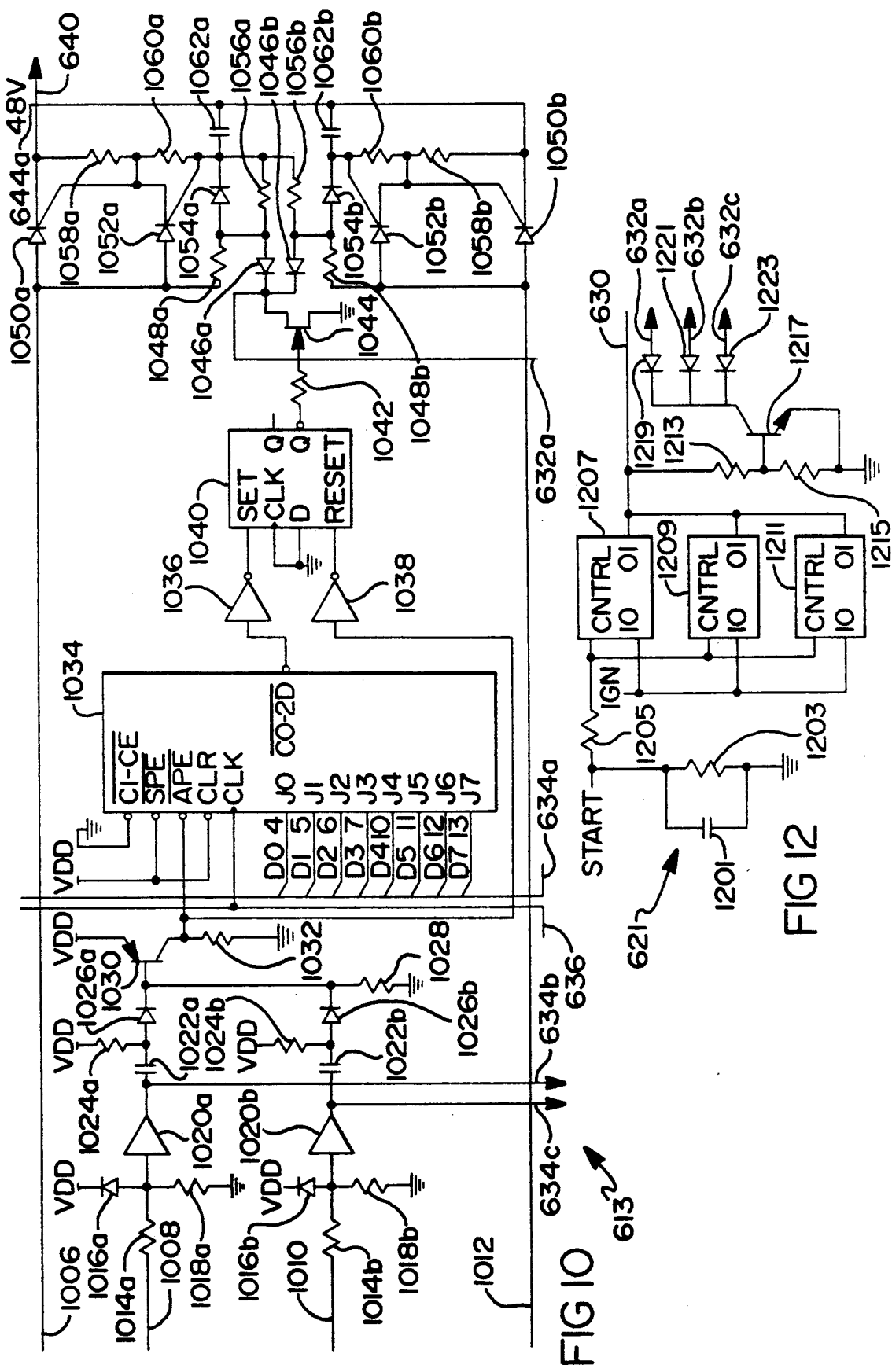

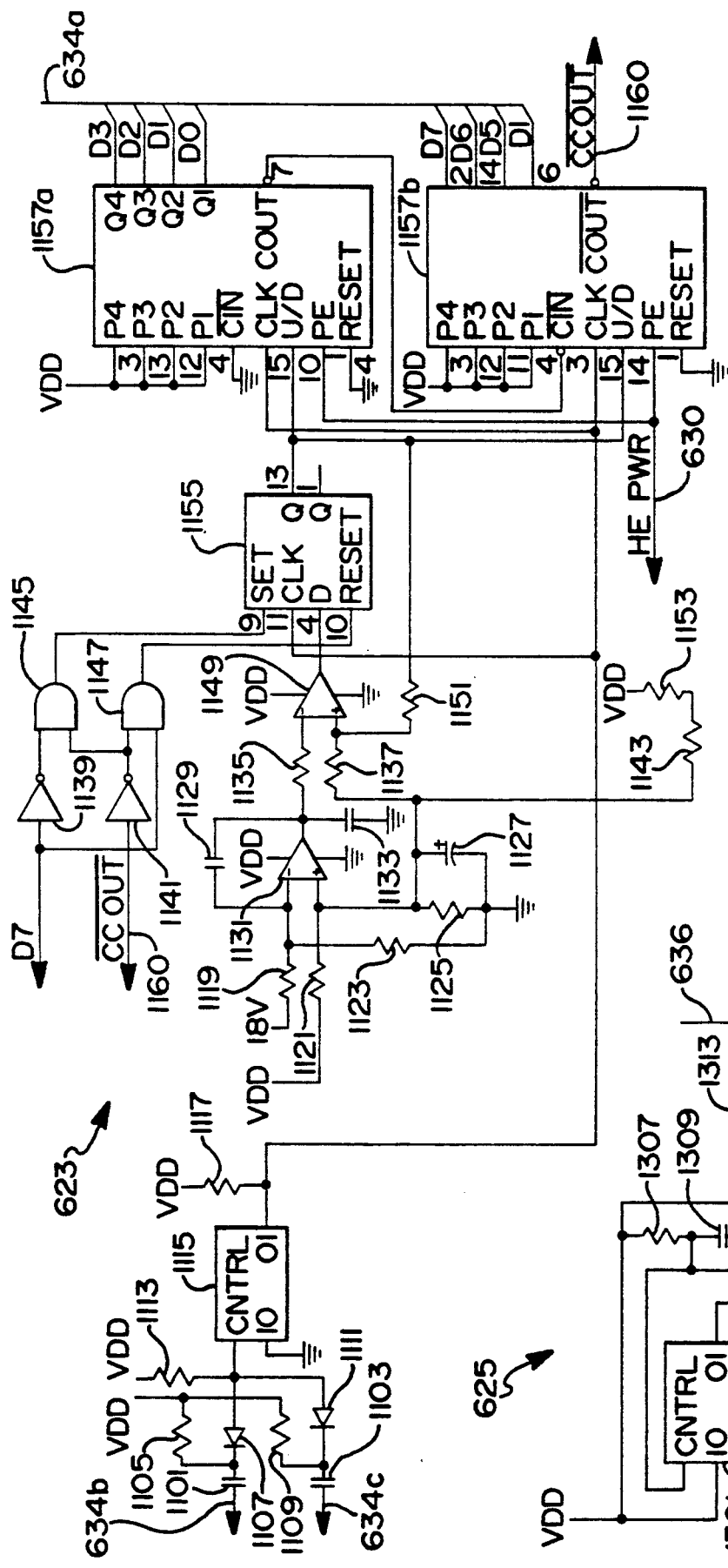

ALTERNATOR STARTER

BACKGROUND OF THE INVENTION

The invention relates to the combination of a electrical motor and generator and more particularly, to a single device performs both starter motor and alternator functions in a vehicular engine system.

In general, an electromagnetic machine can be operated either as a motor or as a generator depending respectively upon whether power is delivered to the unit from an external source of electrical energy or whether the unit is mechanically driven by an external source of mechanical energy, such as an internal combustion engine.

The subject invention comprises a structure particularly adapted for automotive applications which permits the combination of the starter motor function and the generator (generic DC or AC) or alternator (AC) function in a unique package to take advantage of the motor/generator characteristics described above. The subject invention lends itself to being positioned between the internal combustion engine and the transmission in the drive train of an automobile, making use of either the fly wheel or the torque convertor as part of the system. This is in contrast to the traditional location of a separate conventional automotive starter motor which is momentarily connected to the fly wheel on the engine during the cranking or starting cycle, and the traditional location of a separate generator or alternator which is typically belt driven from the crankshaft of the engine. Since these functions of the starter and alternator are combined, the unit arranged in accordance with the principles of the invention may be located in line between the engine and transmission, thereby eliminating the need for being belt or gear driven and to take advantage of the fact that only one motor/generator unit will be used in place of two units, as in present conventional arrangements.

Various approaches in producing a dual purpose starter generator machine for use on motor vehicles have been developed since the early 1900's. For example. U.S. Pat. No. 1,250,718 to Turbanyne, issued Dec. 18, 1917, discloses a DC motor/generator having a rotating armature that is ring wound. When operated as a DC motor, DC current is supplied to the rotor through conventional commutator brushes.

Another starter generator is disclosed in U.S. Pat. No. 1,325,677 to Midgley, issued Dec. 23, 1919. In this design, a conventional DC machine having a wound rotor is fitted with four brushes on the commutator ring. One of these brushes is movable away from the commutator. Movement of the movable brush serves to engage or disengage an automatic circuit as a voltage regulation device when the machine is operated as a generator. When operated as a DC motor, the movable brush effectively disengages the automatic circuit by connecting the circuit across two brushes of the same polarity.

Another example of a starter generator machine is disclosed in U.S. Pat. No. 2,184,236 to Heintz, issued on Dec. 19, 1939. In this machine, in addition to conventional slip rings and brushes for energizing the windings on the rotor during generator and motor operation, the rotor is fitted with rotatable brushes. These rotatable brushes are in engagement with a stationary commutator which feeds low voltage direct current to the stator windings during the engine cranking operation. The rotating brushes are moved out of engagement with the commutator by centrifugal force as the engine crankshaft is accelerated. Thus, in this design, the rotatable brushes provide a rotating stator magnetic field for operation of the device as a motor. When operating as a generator, the Heintz device produces alternating current.

In a more recent starter motor alternator disclosed in U.S. Pat. No. 4,219,739 to Greenwell, issued Aug. 26, 1980, the main rotor winding is connected in series with the main stator winding. In addition, the exciter armature winding is on the rotor and the exciter field winding is on the stator. During starter motor operation, the main rotor winding is connected in series with the starter field winding through a commutator and conventional DC brushes. During alternator operation, the brushes are lifted off the commutator, and the exciter armature winding slip rings are connected to the main rotor winding.

In all of the above examples, external current is fed through a commutator to the windings on the rotor. The current carried by the conductor in the magnetic field produces a torque which causes rotation of the machine as a motor. When operated as a generator or alternator, current is once again fed through a commutator or slip rings to windings on the rotor to provide excitation. These dual purpose motor generator sets have a variety of disadvantages. In any conventional dual purpose machine, certain sacrifices must be made in order to accommodate both generator and motor functions in a single device. For example, previous conventional motor generator designs for use in a motor vehicle such as an automobile or an aircraft have a low power to size ratio, are relatively expensive, and have a high length to diameter ratio. It has therefore been impractical to develop a combined motor generator design for use in automotive engine systems.

The dual purpose machine concept has primarily been utilized in aircraft. However, these machines are extremely complex to manufacture with resultant high cost. Because of the power requirements, overall size and complexity of a conventional motor generator or dual starter motor alternator of conventional design, automotive vehicles utilize separate starter motors and alternators in past practice.

The disadvantages of conventional starter motor designs include very high noise during operation, a low electri-mechanical efficiency, relatively large size requirements, high motor weight and battery size requirements and low reliability. In addition, the necessity for providing a separate alternator increases the overall space allocation requirements for the alternator and starter motor functions.

A known approach to providing a combined starter motor/alternator system is set forth in U.S. Pat. No. 4,862,009 to King. The King patent discloses a combined starter/alternator which may be coupled directly to the vehicle drive train and which may take the form of a permanent magnet motor/alternator machine. The King system utilizes a three phase invertor in the starter mode with an electronic commutation system which uses Hall-effect sensors. Torque multiplication is achieved via a modified planetary gear assembly.

One prior approach to providing motor/generator units having a flat, non-magnetic ironless stator which could be mounted to the drive train of the vehicle is disclosed in U.S. Pat. No. 5,001,412 to Crall et al., issued Mar. 19, 1991, and assigned to the same assignee as the instant invention. However, it has been found that under high speed engine operating conditions, eddy current losses significantly increase in the flat planar windings utilized in the stator of the Crall et al. prior invention.

There also is seen to be a need for a drive circuit in the motor operating mode providing improved protection for the switching devices used therein when subjected to high reverse bias voltages resulting from high speed engine operation with the electrical machine operating in the alternator mode.

SUMMARY OF THE INVENTION

Accordingly, in a first aspect of the invention, apparatus for producing alternating current flow in the stator winding of a motor from a direct current energy source includes a first switch capable of withstanding high reverse bias voltage, such as a silicon controlled rectifier, coupled between the direct current energy source and a first end of the stator winding, a second switch capable of withstanding high reverse bias voltage, such as a silicon controlled rectifier, coupled between the direct current energy source and a second end of the stator winding. a thirth switch coupled between ground potential and the first end of the stator winding, a fourth switch coupled between ground potential and a second end of the stator winding, and a controller for alternately (a) rendering the first and fourth switch conducting so as to establish current flow through the stator winding in a first direction, and (b) rendering the second and third switches conductive so as to establish current flow through the stator winding in a second direction.

In another aspect of the invention, a combined starter motor and alternator for a vehicular engine system having a rotatable power shaft and a source of direct current energy includes a support plate coupled to and rotatable by the power shaft and carrying a plurality of permanent magnets lying in a plane substantially perpendicular to a longitudinal axis of the power shaft, a magnetic flux return plate spaced from the support plate axially along the power shaft axis and coupled to the power shaft for rotation therewith, a stator assembly surrounding the power shaft and positioned between the support plate and the magnetic flux return plate, the stator assembly including at least one phase winding comprised of stranded conductive wire, at least a portion of the turns of the stranded winding lying in planes substantially perpendicular to the power shaft axis, the stranded winding undulating radially inwardly and outwardly of the axis of the shaft. Additionally, the combined starter motor and alternator includes apparatus for directing electrical current from the direct current energy source through the phase windings so as to produce mechanical torque on the shaft in a starter motor mode of operation and a conduction controller for regulating alternator output current from the phase winding when the machine is in an alternator mode of operation.

The construction of the ironless stator assembly housing using non-magnetic materials keeps the axial thickness of the stator assembly as small as possible. The use of non-magnetic materials along with the absence of iron losses and bearing losses and the absence of a need for a separate enclosure due to the utilization of the enclosure provided by the engine and transmission provides a much higher efficiency and output per unit weight ratio compared to conventional starters and alternators. Because there is no iron in the stator assembly body, iron losses developed in the alternator starter are extremely low.

When operated as a starter motor, a sensing mechanism dictates which of the three phase stator windings should be energized and in what sequence in order to produce a constant torque on the power shaft of the vehicle as the support plate containing the permanent magnets rotates with the shaft. The magnetic flux path and direction of the magnetic field from the permanent magnets through an air gap positioned between the magnet support and flux return plates and through the return plate and back to the opposite side of the magnets via the support plate, remains constant and does not change direction as with conventional motors and generators. Consequently, hysteresis and eddy current losses are minimized, and heating in the plates is minimized.

A variety of sensing mechanisms may be utilized. For example, an optical sensor could be utilized to sense position of appropriate marks on the magnet support plate as it rotates. Any suitable mechanism that is correlated to the position of each permanent magnet segment during the magnet plate rotation may be utilized to trigger or appropriately energize the stator windings. For example, in the disclosed embodiment, a set of Hall-effect switching devices is utilized to switch the current within each set of phase windings in the proper order.

Once the vehicle engine is started, the power to the Hall-effect switches is cut off, as the electrical machine is now in the alternator operating mode. When operated as an alternator, sensing the relative positions of the magnets is no longer required. Rotation of the permanent magnets fixed to the disc on the vehicle crankshaft causes a rotating flux which cuts the stationary stator phase windings. This relative motion produces an electromotive force (EMF) in the stator winding proportional to the number of lines of flux cut, the number of conductors (i.e. the number of winding turns), and the speed of relative motion. Since the number of conductors and the total flux is constant, the induced EMF will vary proportional to the speed of rotation of the power shaft or crankshaft of the vehicle.

The stator windings may be connected in three phase delta or wye connection or, preferably, used independently. One of the three phase windings could be utilized to produce DC output to charge the vehicle battery as well as energize appropriate DC circuits within the vehicle. The other two phase windings may remain unused or could be utilized for other purposes such as to produce a regulated AC output for various devices requiring an AC supply. Sufficient output is produced by the present invention so that a single phase may be utilized to provide all DC requirements of a motor vehicle as presently in use.

Present design requirements in automobiles are within the output production capability of a single phase winding of an alternator starter arranged in accordance with the principles of the invention. Alternatively, all three phases of the stator could be coupled via a full wave rectifier circuit into an appropriate voltage regulation circuit to provide total DC output. In such a case, the achievable DC current output far exceeds the electrical requirements of a typical automobile. It is also preferable to use all three stator phases due to the resulting decrease in output ripple.

Other embodiments of the invention are envisioned wherein the stationary components are reversed. In other words, the ironless stator may be rotated with magnets remaining stationary with respect to the rotation of the engine's crankshaft.

BRIEF DESCRIPTION OF THE DRAWINGS

The objects and features of the invention will become apparent from a reading of a detailed description, taken in conjunction with the drawings, in which:

FIG. 1 is a cross-sectional view of a combined motor starter and alternator assembly arranged in accordance with the principles of the invention;

FIGS. 2A and 2B present front and side plan views, respectively, of the magnetic flux return plate 200 of FIG. 1;

FIGS. 3A and 3B respectively set forth front and side plan views of magnet support plate 300 of FIG. 1;

FIG. 8 is a waveform setting forth a typical phase winding voltage cycle when the electrical machine of the invention is operating in an alternator mode;

FIG. 9 is a schematic circuit diagram of the controller circuitry and H-driver circuits 607 for phase one winding P1 of FIG. 6;

FIG. 10 is a circuit schematic diagram of the phase angle controller 613 associated with winding P1 of FIG. 6;

FIG. 11 is a functional circuit schematic diagram of the circuitry of regulator controller 623 of FIG. 6;

FIG. 12 is a functional block diagram of the mode control circuit 621 of FIG. 6; and FIG. 13 is a functional schematic of high frequency clock 625 of FIG. 6.

DETAILED DESCRIPTION

Figure 4A:
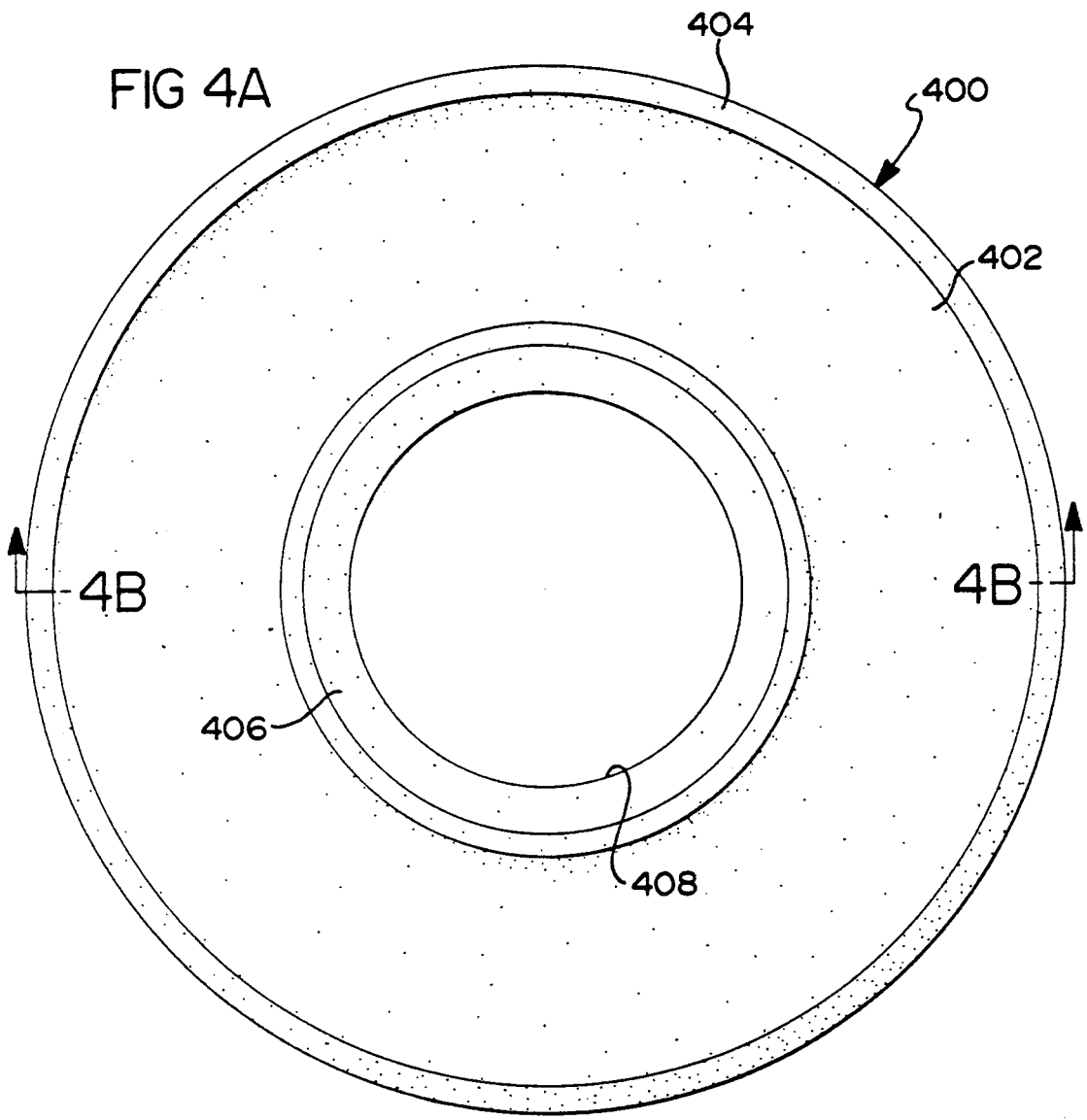
FIGS. 4A and 4B respectfully depict a front plan view and a side cross-sectional view of stator assembly 400 of FIG. 1.

The mechanical arrangement of a combined starter motor and alternator following the principles of the invention is set forth in FIGS. 1-5. With reference to FIG. 1, the combined starter motor and alternator is a relatively thin disk shaped combined apparatus which encircles the power or crankshaft 100 of an automotive vehicle. The term power shaft or crankshaft refers to any type of shaft rotatable by the vehicle's engine. Mounting flange 102 of crankshaft 100 provides threaded bores for the receipt of mounting bolts 104, which couple a magnetic return plate 200 and a permanent magnet support plate 300 to the crankshaft for rotation therewith.

Plates 200 and 300 have outer annular disk portions which are spaced along longitudinal axis 106 of shaft 100 so as to provide an annular channel therebetween. In this channel is positioned a stator assembly 400 which does not rotate with rotation of crankshaft 100, and a plurality of permanent magnets 108 which are carried by plate 300 for rotation therewith.

As seen from FIGS. 2A and 2B, magnetic return plate 200 takes the form of a substantially circular disk having an annular outer stator winding cover portion 202, an inner annular stator assembly receiving cavity or depression 204, a central mounting flange portion 206, and a central bore 210 for receiving annular hub 310 of magnet mounting plate 300 (FIGS. 3A and 3B). Central mounting flange portion 206 includes a polarity of bores 208 for receipt of the mounting bolts 104 (FIG. 1).

As seen from FIGS. 3A and 3B, magnet support plate 300 is a substantially circular disk having an outer annular area 302 providing mounting positions for a plurality of permanent magnets. For example, if a 15 degree arcuate sector is provided for each permanent magnet, then 24 such magnets may be mounted in area 302. Magnet support plate 300 additionally includes an axially extending magnet retention flange portion 304 at the plate's radially outer rim, along with a central mounting annular section 306, which includes a plurality of mounting bolt receiving bores 308. Bores 308 are aligned with bores 208 (FIG. 2B) of magnetic flux return plate 200. Magnet support plate 300 additionally includes a central annular hub portion 310, the outer diametrical portion of which engages the mounting flange portion 206 of flux return plate 200 (FIGS. 2A, 2B), and the inner diameter of which abuts a hub portion 110 (FIG. 1) of crankshaft mounting flange 102. Magnet support plate 300 also includes a central crankshaft mounting flange hub receiving bore 312, which receives hub portion 110 of crankshaft 100 (FIG. 1).

Figure 4B:
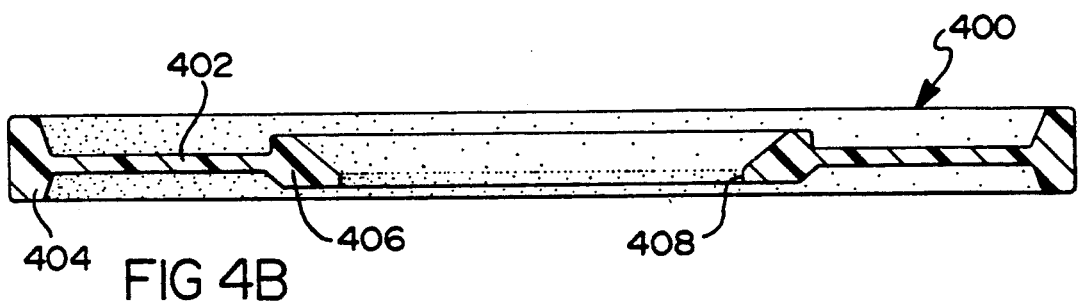

FIGS. 4A and 4B set forth further details of the stator assembly 400 of FIG. 1, shown minus the stator phase coil windings embedded therein for clarity. The body of stator assembly 400 is an ironless, non-magnetic material such as a glass and resin matrix. The body includes a central annular portion 402 which encases straight portions 502 (FIG. 5) of stranded wire stator winding turns. Outer flange portion 404 of stator assembly 400 encases or encapsulates outer arcuate portions 504 of stranded wire stator turns (see FIG. 5), while inner flange portion 406 encases or encapsulates inner arcuate portions 506 of stranded wire stator winding turns. Stator 400 additionally includes a central bore 408 for receipt of mounting flange 206 of return plate 200 and mounting annulus 306 of magnet mounting plate 300. Central bore 408 provides clearance between elements 206 and 306 (see FIG. 1, for example) such that magnetic return plate 200 and magnet plate 300 will rotate with crankshaft 100, while stator 400 will remain stationary in the annular space provided therebetween.

Figure 4C:
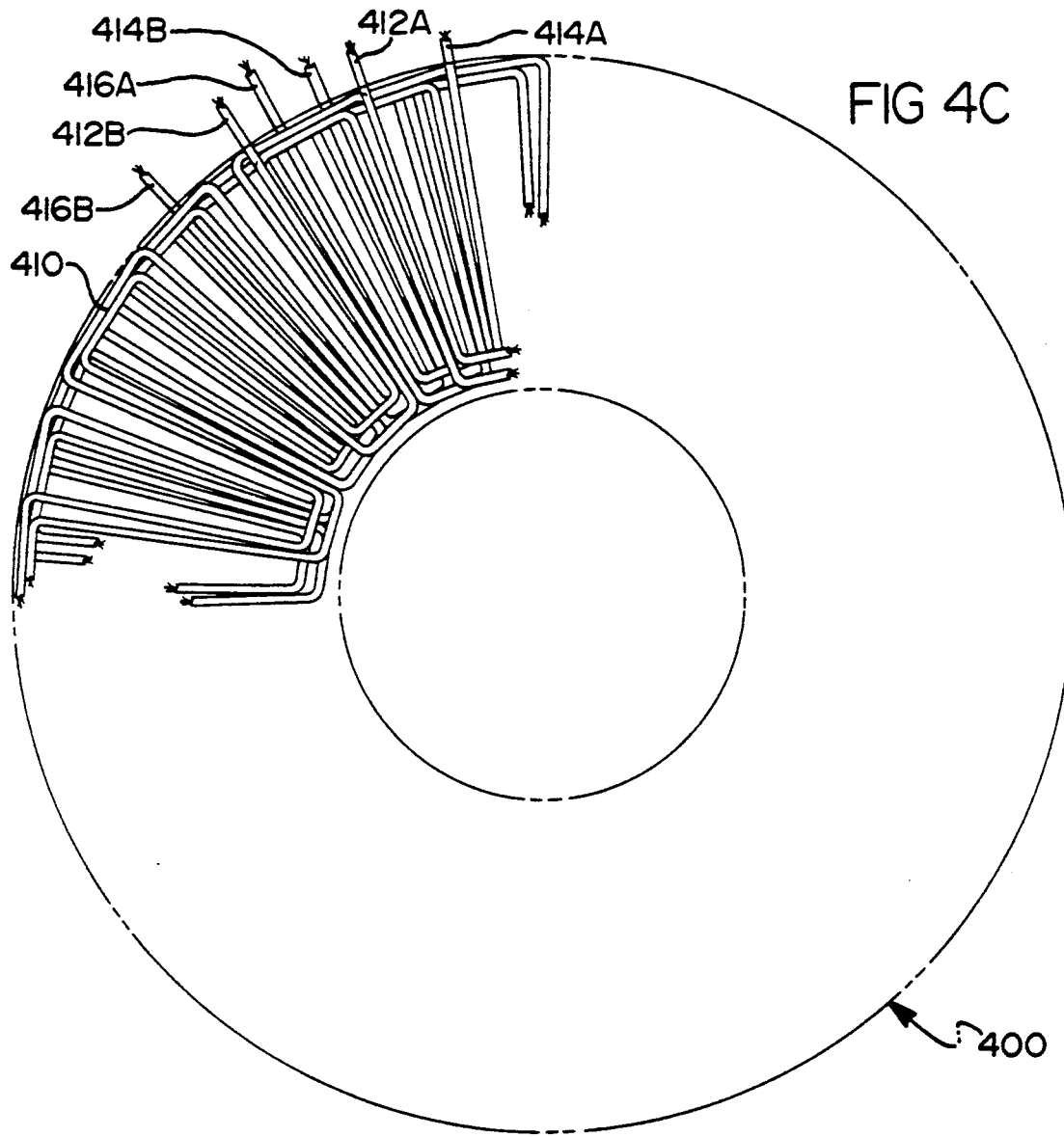
FIG. 4C depicts a front view of stator assembly 400 showing the arrangement of the stranded wire stator phase windings.

With reference to FIG. 4C, the general positioning arrangement of stranded wire stator windings 410, which are encapsulated in the glass and resin matrix of the stator assembly is depicted. In the embodiment shown and described herein, stator assembly 400 includes three phase windings undulating radially inwardly and outwardly between portions 404 and 406 of stator assembly 400, as one traverses stator 400 circumferencially about a longitudinal axis of the crankshaft in a plane or planes substantially perpendicular thereto. 412A and 412B designate the beginning and ending ends of the winding for phase one, respectively. 414A and 414B respectively designate the beginning and ending ends of the winding for stator winding phase two, while 416A and 416B respectively designate the beginning and ending ends of the winding for stator phase 3. It is to be noted that the stranded wire stator phase windings are confined to as narrow a stator body axially extending portion as possible to achieve the goal of placing as much winding conductive material as possible into the stator. This is due to the fact that an increased stator axial length would lead to a requirement for stronger permanent magnets to achieve the same alternator output power or starter motor torque in the same machine.

Figure 5:
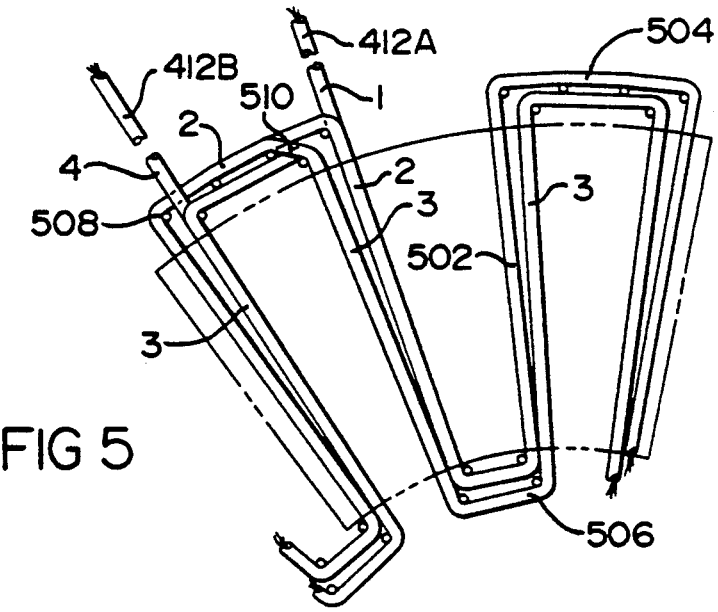
FIG. 5 is a diagram of an enlarged portion of a stator phase winding showing the axial and radial stacking thereof.

Further details of how each phase winding of the stator are configured are set forth in FIG. 5. As seen from FIG. 5, each undulating turn of the phase winding as the turn proceeds around the annular ring 402 of stator 400 includes straight portions 502 which are embedded in annular portion 402, outer arcuate portions 504 embedded in flange portion 404, and inner arcuate portions 506 encapsulated or embedded in flange portion 406. The specific shape of the undulating turns is dictated by a plurality of winding guide pins 508 which extend from an inner face of a molding tool for the glass and resin matrix stator body. It is to be noted that the multiple turns of each phase winding are stacked both axially along the longitudinal axis of the crankshaft and radially in planes substantially normal to the crankshaft axis. In the specific embodiment shown in FIG. 5, four turns are provided in each phase winding housed by stator 400. It should also be noted that it is contemplated that in fabricating the encapsulated stator windings in stator assembly 400, the winding guide pins 508 of FIG. 5 are removed from the mold prior to the actual formation of the stator housing.

FIG. 5 sets forth the arrangement for the phase one stator winding, which begins at 412A. In the view of FIG. 5, only two of the four undulating windings are visible in most of the diagram. The four turns are designated 1, 2, 3 and 4. It will be understood that turn 1 lies, for the most part, directly underneath turn 2, while turn 3 lies, for the most part, directly above turn 4. As seen in FIG. 5, the beginning of the winding at 412A proceeds into the commencement of winding turn 1. Turn 1 undulates radially inwardly and outwardly of the stator body directly beneath winding 2, making a full circle about the annular housing area to back near the starting point where turn 1 then becomes turn 2, which is wound directly axially on top of turn 1. Turn 2 likewise undulates in a complete circle through the annulus until it comes to a transition area 510 where turn 3 begins in substantially the same plane as turn 2, but spaced therefrom in that plane. Turn 3 then traverses the annular area in a complete circle and returns directly underneath the transition area 510, where turn 4 begins underneath turn 3. Turn 4 then likewise undulates in a complete circle until it is brought out as a terminating end 412B. It will be appreciated that, as space permits, more turns may be axially and radially stacked in the stator body.

Figure 6:
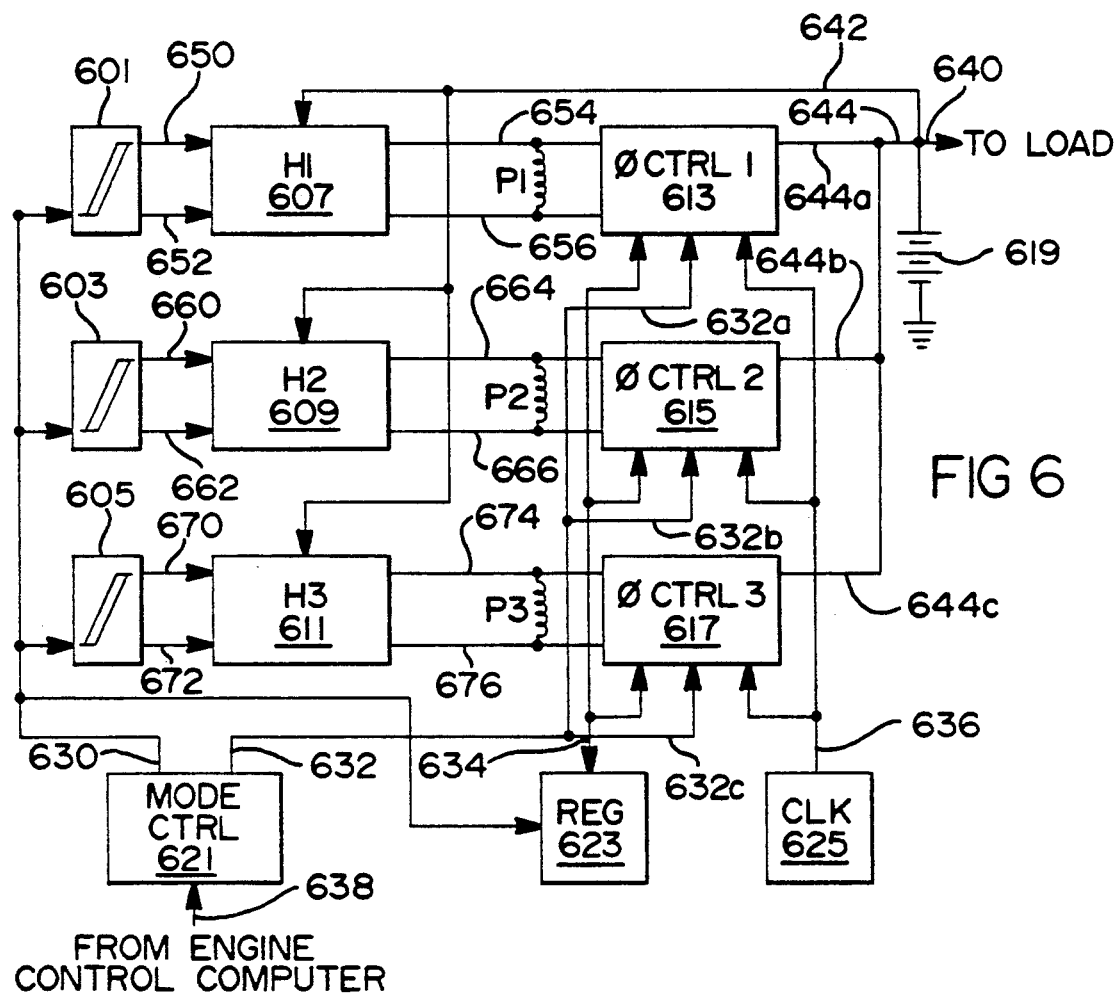
FIG. 6 is a functional block diagram of the electronic control circuitry utilized in both the starter motor and alternator modes of operation of an electromagnetic machine arranged in accordance with the principles of the invention.

Electronic circuitry control aspects of the invention are set forth in FIGS. 6–13. With reference to FIG. 6, a functional block diagram of the control circuitry for the starter motor and alternator modes of operation of the inventive arrangement is set forth. For each phase winding in the stator, three in this embodiment, the starter motor mode of operation requires a polarity detection and current switch drive control per phase winding. Magnetic polarity detection is provided by Hall-effect switches 601, 603, and 605, which are respectively located adjacent phase windings P1, P2, and P3 in stator body 400 of FIG. 1. Phase 1 detector device 601 has outputs 650 and 652 coupled to H-driver and control circuit 607, which is coupled via leads 654 and 656 to opposite ends of stator phase winding P1 and to inputs of phase angle control circuit 613 for phase one winding P1.

Phase control 613 has an output 644a coupled via bus 644 to the vehicular battery or direct current energy source 619. Battery 619 is additionally coupled via bus 640 to the various loads circuits in the automotive engine system and via bus 642 to H-switches 607, 609, and 611.

The arrangement set forth above is replicated for phases 2 and 3, as shown in FIG. 6. Polarity detector 603 has outputs 660 and 662 coupled to inputs of H-switch and control circuit 609, which has its outputs coupled to opposite ends of stator phase winding P2 via leads 664 and 666, which also are coupled to inputs of conduction phase angle controller 615. Controller 615 is coupled via its output 644b to bus 644.

The polarity detector for the third stator phase winding P3 is designated 605 and has its outputs 670 and 672 coupled to inputs of H-driver and control circuitry 611, which has outputs coupled across phase winding P3 via lead 674 and 676, which are also coupled to inputs of conduction phase angle controller 617. Controller 617's output 644c is coupled to bus 644 to battery 619 and the vehicular electrical load.

Enabling power for detectors 601, 603 and 605 is furnished via bus 630 from mode controller 621 in the starter motor mode of operation of the device. The selection of the starter motor mode or the alternator mode of operation is selected from an engine control computer (not shown) which passes appropriate selection signals to controller 621 via bus 638.

The mode control signal on bus 630 is additionally passed to an input of regulator control circuit 623. Regulator control 623 is operative only during the alternator mode of operation and passes phase delay control data via bus 634 to phase angle controllers 613, 615 and 617. Additionally, in the alternator mode of operation, controllers 613, 615, and 617 are disabled via signals on bus 632 emanating from mode controller 621. The specific disabling signals are coupled to controllers 613, 615, and 617 by bus portions 632a, 632b, and 632c, respectively.

A high frequency clock circuit 625 supplies timing signals on bus 636 to conduction angle controllers 613, 615, and 617.

Figure 7:
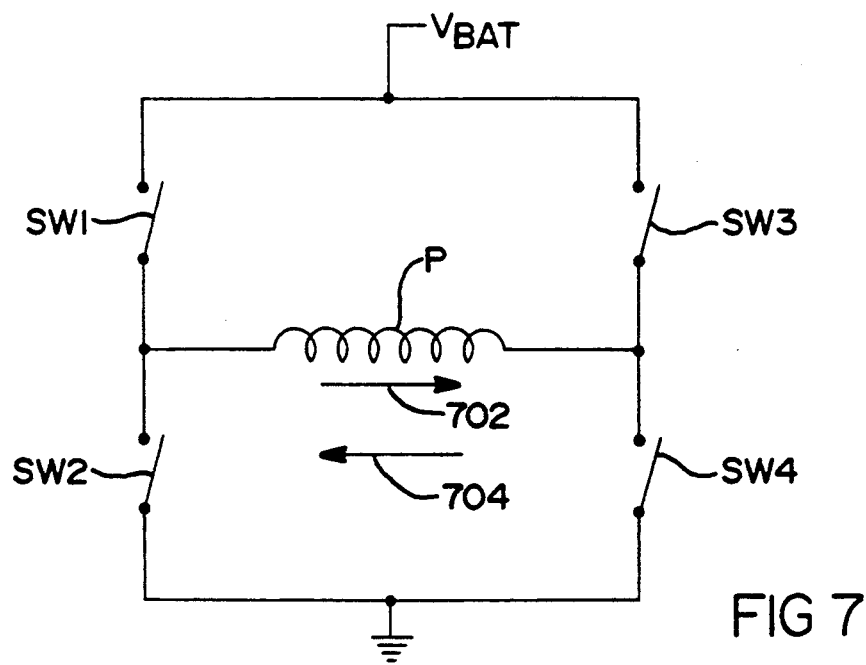
FIG. 7 is a schematic diagram of a conventional H-switch drive circuit for a stator winding of a machine operating in a motor mode.

Before discussing further details of the functional blocks set forth in FIG. 6, reference is made to FIG. 7 which depicts a conventional switch arrangement for a stator coil in a motor operating mode. The switch arrangement is commonly referred to as an H-driver, due to the configuration of the four switches with respect to the stator winding P.

Alternating current through phase winding P is generated by the H-switch circuit by alternately closing switch SW1 and SW4 and opening SW2 and SW3 to provide for current flow from the DC energy source in a direction indicated by the arrow 702, and later in time by simultaneously closing switches SW2 and SW3 and opening SW1 and SW4 to generate current flow in a direction shown by arrow 704.

In the alternator mode of operation, all switches SW1 through SW4 are to remain open or non-conductive, and the induced voltage across and current through winding P is then controlled by the conduction phase angle controller which is also coupled to winding P. In the alternator mode of operation for a vehicular engine system, as the engines speed increases, switches SW1 and SW3 will see a very high reverse potential thereacross due to the high induced voltage at stator coil P. By "high reverse voltage" is meant on the order to ten times the normal forward bias voltage seen by such switches—i.e. ten times the potential level of the DC energy source of the vehicle represented by $V_{BAT}$. Such a voltage ratio will occur as the engine speed goes above the cranking speed of the motor. Hence, for such an automotive application, it has been determined that switches SW1 and SW3 should be power switching devices exhibiting a resistance to breakdown or reverse conduction, even in the presence of such high reverse bias voltages. As will be seen in a later detailed description of the H-circuit of this invention, the reverse bias problem has been overcome by utilizing silicon controlled rectifier power switches for elements SW1 and SW3.

In the alternator mode of operation of the machine embodying the invention, each phase is given a preselected current conduction time through the respective phase winding, in accordance with a control arrangement which modifies the conduction time per half cycle of the induced voltage waveform, in accordance with the amplitude of the induced voltage with respect to the potential level of the battery or direct current energy source. As seen from FIG. 8, each phase angle conduction controller 613, 615, and 617 (FIG. 6) is given a desired delay time d designated as 804 which is utilized to inhibit current flow through the associated phase winding until the time delay d has expired. Delay d is measured from a preselected induced voltage level which is just above a zero crossing of the induced voltage. This trigger level can, in theory, lay anywhere between the zero and DC level 802 shown in FIG. 8. The conduction time c then takes place for the remaining half cycle of the induced voltage wave form, as seen in FIG. 8.

Hence, the alternator output voltage (i.e. the average value thereof) will be modified as the conduction time is modified. As the engine system electrical load increases, the induced voltage will decrease, therefore requiring a larger conduction time c, or correspondingly a smaller delay time d, such that the average value of the alternator output voltage may be increased to meet the load requirements of the system. It will therefore be seen that each phase conduction angle controller 613, 615, and 617 of FIG. 6 should include a level crossing detector, a delay element, and output power switches whose conduction states are inhibited until the expiration of the desired delay time. Additionally, a regulator controller compares the level of the alternator output voltage with a predetermined reference and either increases or decreases the delay time provided by the conduction angle controllers. Further details of a specific embodiment will be explained below.

FIG. 9 sets forth further details of the circuit arrangement of the H-switch and controller therefor, 607 of FIG. 6, which is associated with the first stator phase winding P1. It will be understood that the details for elements 609 and 611 of FIG. 6 are identical to those set forth for element 607. Additionally, identical reference numerals are used for the same leads and elements common to more than one of FIGS. 6 through 13. With the arrangement shown in FIG. 6, with replicated control circuitry for each phase winding, the system is controlled as if three separate single phase motors were present.

As mentioned previously, each stator phase winding has associated therewith a plurality of detection switches, such as switch 601 of FIG. 9. Switch 601 could, for example, comprise a commercially available Hall-effect switch type UGN3235K, marketed by Allegro Microsystems. Hall-effect switch 601 has two open-collector, independent outputs which respond to magnetic flux of a predetermined polarity. Output 650 of switch 601 goes to ground in the presence of a north pole of a magnet, while output 652 goes to ground in the presence of a south pole.

Hall-effect switch output 650 is coupled to a junction of resistor 902a and capacitor 904a, and via resistor 916a to a base electrode of switching transistor 920a. Capacitor 904a has a second terminal coupled as an input to a one-shot multivibrator comprised of resistor 906a, capacitor 908a and transistor 910a, all connected as shown in FIG. 9.

The output of the one-shot multivibrator at the collector electrode of transistor 910a is coupled to the base electrode of transistor 920a via resistor 914a, and to bias voltage $V_{DD}$ via resistor 912a. A collector electrode of transistor 920a is coupled to its base electrode via capacitor 918a and to bias potential via resistor 950a. The collector electrode of transistor 920a is additionally coupled via resistor 922a to a gate electrode of field effect transistor 926a.

A source electrode of field effect transistor 926a is coupled via resistor 924a to the vehicle's direct current energy source designated 48 V, and to optically coupled silicon controlled rectifier (SCR) switch 930a. A drain electrode of field effect transistor 926a is coupled to an input for enabling Darlington connected power transistor package 940a. The output of the optically coupled SCR circuit 930a is coupled to a gate electrode of SCR 938b.

As seen from FIG. 9, the circuit arrangement for output 652 of Hall-effect switch 601 is a replication of the circuitry whose structure is set forth above for output 650. Corresponding circuit elements bear the suffix b, rather than a, for the elements associated with switch output 652.

An anode electrode of SCR 938a is coupled to the vehicle's battery, while the cathode electrode of SCR 938a is coupled via path 654 to one end of stator phase winding P1. The output current conducting circuit of Darlington stage 940a is coupled between ground potential and lead 654. In a similar manner, SCR 938b has its anode to cathode conduction path coupled between the vehicle direct current energy source and lead 656, which is coupled to another end of phase winding P1. Darlington stage 940b has its output conduction path coupled between ground and the same end of winding P1 via lead 656.

The alternator control circuitry of FIG. 10 to be described below, is coupled to phase winding P1 via leads 1006, 1008, 1010, and 1012. Leads 1006 and 1012 are coupled to opposite ends of winding P1 via current limiting chokes 1002 and 1004, respectively.

In the starter motor mode of operation, the mode control circuit 621 of FIG. 6 supplies enabling power to Hall-effect switch 601 via lead 630. Under this condition, assume that switch 601 detects the presence of a north magnetic pole. Upon such detection, switch 601 will place a ground potential signal on output 650. After a preselected time delay provided by the one-shot multivibrator centered about transistor 910a, the ground signal at switch output 650 will be coupled to one side of resistor 912a thereby diverting base drive current from transistor 920a, which is normally in the conductive state thereby switching transistor 920a off. When transistor 920a becomes non-conductive, enabling current is provided via resistor 922a to the gate electrode of field effect transistor 926a, thereby rendering 926a conductive. 926a becoming conductive substantially simultaneously renders optically coupled SCR 930a and the Darlington connected power transistor switch 940a conductive. The delay provided by the one-shot multivibrator centered about transistor 910a is utilized to guard against the possibility of short circuiting the phase winding due to the turn-off delay characteristics of the silicon controlled rectifier switches in the drive circuitry to be discussed below. Such characteristics could lead to switching on one device before its counterpart at the opposite end of the phase winding can turn completely off. If more expensive power switching devices with sufficiently low turn-off times are utilized in the H-drive circuitry, the one-shot multivibrator delay may be eliminated from the control circuitry.

Optical coupled SCR 930a becoming conductive provides enabling gate current to SCR switch 938b, thereby closing a current path from the vehicle's battery supply to one end of winding P1 via lead 656. The return path for the current now flowing upwards through winding P1 as seen from FIG. 9 is provided by the output collector to emitter stage of the Darlington switch 940a to ground potential. When the ground potential signal at input 650 is removed, transistor 920a will be rendered conductive by base drive current via resistor 916a.

In a similar manner, if switch 601 detects a south pole, ground potential at switch output 652 will, after an appropriate delay, render field effect transistor 926b conductive, which in turn, via the base drive of Darlington pair 940b and the optically coupled SCR 930b will render Darlington switch 940b and SCR 938a conductive, thereby providing a current path from the vehicle's battery supply downward, as viewed in FIG. 9 through stator coil P1. It will be seen that SCR 938b corresponds to switch SW1 of FIG. 7, Darlington stage 940a corresponds to switch SW2 of FIG. 7, SCR 938a corresponds to switch SW3 of FIG. 7, and Darlington stage 940b corresponds to switch SW4 of FIG. 7.

The phase angle conduction control for the alternator mode of operation may take the form of the circuitry depicted in FIG. 10. Voltage induced in winding P1 during the alternator mode will produce current which may flow either via lead 1006 through power SCR 1050a or via lead 1012 through power SCR 1050b to the vehicle direct current energy source or battery via lead 644a and to the engine system electrical load via bus 640. The purpose of the circuitry of FIG. 10 is to determine the conduction time of either SCR 1050a or 1050b for each corresponding half cycle of the voltage induced in the stator winding P1.

As seen from FIG. 10, opposing ends of stator phase winding P1 are coupled via leads 1008 and 1010 to level detector circuitry which detects the crossing of the induced voltage wave-form of a predetermined point to begin the delay period in the conduction control angle process. This time point is designated 808 in FIG. 8. Lead 1008 is coupled via a voltage divider comprised of resistors 1014a and 1018a whose junction is coupled via diode 1016a to a bias voltage. The voltage divider determines the voltage level at which the detector is to provide an output signal. Preferably, the detector detects a level just above the zero crossing and just below the DC level 802 (FIG. 8) of the induced voltage wave form.

The voltage divider 1014a, 1018a is coupled to an input of an input buffer 1020a whose output is coupled to a one-shot multivibrator centered around transistor 1030 and capacitor 1022a. The output of buffer 1020a is also passed via lead 634b to the control regulation circuitry of FIG. 11 to be discussed below.

The output of the one-shot multivibrator centered about transistor 1030 is taken from the junction of a collector electrode of transistor 1030 and resistor 1032, which is coupled to ground potential. Transistor 1030 is normally on, thereby providing a positive logic level at the multivibrator's output. Upon detecting the desired level, the multivibrator circuit is triggered such that transistor 1030 is turned off providing the required low logic level enabling input to downcounter 1034. This enabling input allows counter 1034 to be loaded or "jam-set" with a preselected delay time value at pins J0 through J7 from the regulator controller of FIG. 11. Counter 1034 counts down for the predetermined period specified by J0-J7, and upon reaching the end of its count, generates a negative going signal at its output $\overline{CO\text{-}ZD}$. The negative going output from the counter is inverted by invertor 1036 to set-reset flip flop 1040, which in turn renders field effect transistor 1044 nonconductive. Transistor 1044 in the off state allows either SCR 1052a or 1052b to provide amplified gate enabling current to either SCR 1050a or 1050b, respectively, depending upon which of the power SCRs 1050a or 1050b has the appropriate conduction state polarity across its anode-cathode circuit, in accordance with the state of the induced voltage across winding P1.

Hence, at a predetermined delay (804 of FIG. 8) from the desired signal point crossing (808 of FIG. 8), current will be generated towards the vehicular battery via path 644a and to the vehicle's electrical load via bus 640 via either SCR 1050a or 1050b for a chosen conduction interval (806 of FIG. 8). SCRs 1052a and 1052b are small signal SCRs utilized to trigger the power SCRs 1050a and 1050b, respectively.

Flip flop 1040 is reset upon the occurrence of the next zero or predetermined level detection crossing via invertor 1038.

On alternate half cycles of the induced voltage across stator winding P1, an identical crossing detector centered about buffer 1020b and voltage divider comprised of resistors 1014b and 1018b is utilized via lead 1010 coming from an opposite terminal of stator coil P1 to again turn off transistor 1030 and begin the down counting process at counter 1034. As with the level detector centered about buffer 1020a, the output of buffer 1020b is passed via lead 634c to the regulator control circuit of FIG. 11 to be discussed below. A high frequency clock signal at bus 636 is utilized to drive the down-count process at counter 1034 and the signals on bus 636 are developed at high frequency clock circuit 625 of FIG. 13 to be discussed further below.

The circuitry of the phase angle conduction controller 613 of FIG. 10 is disabled in the starter motor mode of operation of the machine by a ground potential signal on lead 632a emanating from the mode control circuitry 621 of FIGS. 6 and 12. Ground at lead 632a will inhibit the conduction of switching SCRs 1052a and 1052b which, in turn, will maintain power SCRs 1050a and 1050b in the non-conductive or off state.

Circuit details of the regulator controller 623 of FIG. 6 are set forth in the circuit diagram of FIG. 11. Lead 634b is coupled to a first terminal of capacitor 1101 whose opposite terminal is coupled to a junction of resistor 1105 and a cathode electrode of diode 1107. An anode electrode of diode 1107 is coupled to the CNTRL input of bilateral switch 1115. Switch 1115 is a type CD 40668, which conducts in both directions between terminals IO and OI whenever a logic high signal appears at its CNTRL input. In a similar manner, lead 634C is coupled via capacitor 1103 to a junction of resistor 1109 and a cathode electrode of diode 1111. The anode electrode of diode 1111 is coupled to the CNTRL input of bilateral switch 1115. The combination of resistive and capacitive elements as shown, along with the bilateral switch elements, forms a one-shot multivibrator triggered in accordance with the frequency of the voltage being induced in the first phase winding P1 of the stator. This is seen from the fact that leads 634b and 634c originate at the outputs of the crossing detectors in the conduction control circuitry 613 of FIG. 10.

The output of the clock circuit at switch 1115 is coupled to the CLK inputs of a D-type toggle flip flop 1155 and of an eight bit up/down counter formed by the combination of the two four-bit up/down counters 1157a and 1157b.

Operational amplifier 1131, along with resistors 1119, 1121, 1123, 1125, and capacitors 1127, 1129, and 1133, when connected as shown in FIG. 11, form an integrating circuit for integrating the difference between the desired vehicle system DC voltage and a preselected reference. The output of the integrator centered about operational amplifier 1131 is fed to a comparator comprised of operational amplifier 1149 along with resistors 1135, 1137, and 1151. The output of the comparator 1149 is used to toggle flip flop 1155. The output of flip flop 1155 is used to either request an upcount or a downcount from the counters 1157a and 1157b.

A carry-out signal at path 1160 of counter 1157b is coupled via an invertor 1141 to a first input of AND-gates 1145 and 1147. The highest order output bit D7 of counter 1157b is coupled via invertor 1139 to a second input of AND-gate 1145 and directly to a second input of AND-gate 1147. The output of AND-gate 1145 is coupled to a SET input on flip flop 1155, while the output of AND-gate 1147 is coupled to a RESET input of flip flop 1155. The toggle flip flop 1155, configured as shown with its logic circuitry coupled thereto and with the output of the basic clock circuit from switch device 1115, is used to synchronize the up/down count function with the clock signal being generated by monitoring a phase of induced voltage at the stator via leads 634b and 634c. Logic gates 1139, 1141, 1145 and 1147 are used as shown in their configuration of FIG. 11 to prevent carry-around of the up/down counter outputs to either all zeros or all ones.

Hence, regulator control 623 continuously compares a desired alternator output voltage to the actual output voltage and adjusts the delay count J0-J7 of FIG. 10, in accordance with the outputs of an eight-bit counter D0-D7 from counters 1157a and 1157b of FIG. 11. For the elements connected as shown, the gain of the circuitry is proportional to the speed of the alternator. Therefore, as the alternator voltage gets very high at high engine speeds, the gain function is correspondingly increased. When the alternator output voltage becomes too high, the logic circuitry and comparison elements of FIG. 11 determine that the conduction interval is occurring too soon, and that therefore a longer delay time d (i.e. a larger count value to be set into counters 1034 of FIG. 10) is required. Therefore, counters 1157a and 1157b are instructed to count up to yield a longer time d. This time period is then transferred via bus 634a to the inputs of the down counter 1034 of FIG. 10.

It should also be noted that the functions performed by the circuitry of FIG. 11 could be alternatively performed in a microprocessor or as part of the engine system control processor. Such a processor would be utilized to monitor the alternator output voltage, compare it to a preselected standard and to generate a desired delay count for transmission to the counting elements of the conduction angle controller 613, 615 and 617 of FIGS. 6 and 10. Use of the microprocessor alternative would have the advantage of yielding a nonlinear gain function by using, for example, a lookup table of desired gain versus the voltage being regulated.

FIG. 12 sets forth a circuit diagram for the mode control unit 621 of FIG. 6. Again, bilateral switch elements 1207, 1209, and 1211, having the same characteristics as described above with reference to the switch element 1115 of FIG. 11, are utilized to provide parallel power switches to the Hall-effect switches and to the alternator mode conduction control. When a start mode request signal is received on bus 638 from the engine control computer, output power for the Hall-effect switches 601, 603, and 605 is coupled thereto via bus 630. Additionally, the signal on bus 630 is coupled to the regulator controller 623 to inhibit the operation of the counters 1157a and 1157b (FIG. 11). Additionally, during the starter mode time period, transistor 1217 is rendered conductive to place a ground signal on leads 632a, 632b, and 632c to respectively disable the conduction phase control circuits 613, 615, and 617 of FIGS. 6 and 10, as previously described with reference to those figures.

Details of a high frequency clock circuit 625 of FIG. 6 are set forth in FIG. 13. With the bilateral switch elements 1301, 1303, and 1313 interconnected as shown along with resistive elements 1305, 1307, 1311, and 1315, and with capacitor 1309, the circuitry of FIG. 13 provides a high frequency free running multivibrator clock output for use by the downcounters of the conduction phase controllers 613, 615, and 617 of FIG. 6 and FIG. 10. The clock output is supplied at bus 636.

The invention has been described with reference to details of a preferred embodiment, for the sake of example. The scope and spirit of the invention is to be interpreted by the appended claims as interpreted in light of the specification.

I claim:

1. In a motor having at least a first phase stator winding, apparatus for producing alternating current flow in the stator winding from a direct current energy source, the apparatus comprising:

first switching means capable of withstanding high reverse bias voltage coupled between the direct current energy source and first end of the stator winding;

second switching means capable of withstanding high reverse bias voltage coupled between the direct current energy source and a second end of the stator winding;

third switching means coupled between ground potential and the first end of the stator winding;
fourth switching means coupled between ground potential and the second end of the stator winding; and control means for alternatively
(a) rendering the first and fourth switching means conductive so as to establish current flow through the stator winding in a first direction, and
(b) rendering the second and third switching means conductive so as to establish current flow through the stator winding in a second direction.

2. The apparatus of claim 1, wherein the control means includes means for detecting magnetic polarity of the stator winding, first means for rendering the first and fourth switching means conductive whenever a first magnetic polarity is detected, and second means for rendering the second and third switching means conductive whenever a second magnetic polarity is detected.

3. The apparatus of claim 2, wherein the means for detecting magnetic polarity comprises a Hall-effect switch mounted adjacent the stator winding and having first and second outputs respectively coupled to the first and second means for rendering.

4. The apparatus of claim 3, wherein the first means for rendering comprises:
first control switch means having an input coupled to the first Hall-effect switch output, a first output coupled to an enabling input of the first switching means and a second output coupled to an enabling input of the fourth switching means;
and wherein the second means for rendering comprises:
second control switch means having an input coupled to the second Hall-effect switch output, a first output coupled to an enabling input of the second switching means and a second output coupled to an enabling input of the third switching means.

5. The apparatus of claim 4, wherein the first and second control switch means each include time delay means coupled to their inputs.

6. The apparatus of claim 1, wherein the first and second switching means respectively comprise first and second silicon controlled rectifiers.

7. The apparatus of claim 4, wherein the first and second switching means respectively comprise first and second silicon controlled rectifiers, wherein the enabling input of the first switching means comprises a gate electrode of the first silicon controlled rectifier, and wherein the enabling input of the second switching means comprises a gate electrode of the second silicon controlled rectifier.

8. In a combined starter motor and alternator for a vehicular engine, the combined starter motor and alternator having at least a first phase stator winding, apparatus for controlling current flow in the stator winding comprising:
first silicon controlled rectifier switch means coupled between a direct current energy source and a first end of the stator winding;
second silicon controlled rectifier switch means coupled between the direct current energy source and a second end of the stator winding;
third switching means coupled between ground potential and the first end of the stator winding;
fourth switching means coupled between ground potential and the second end of the stator winding; and
control means operative, whenever the combined starter motor and alternator is operating as a starter motor, to alternatively
(a) render the first and fourth switch means conductive so as to establish current flow through the stator winding in a first direction, and
(b) render the second and third switch means conductive so as to establish current flow through the stator winding in a second direction.

9. The apparatus of claim 8, further comprising phase angle control means coupled between the first and second end of the stator winding, first power switch means coupled between the first end of the stator winding and the direct current energy source, and second power switch means coupled between the second end of the stator winding and the direct current energy source, the phase angle control means operative, whenever the combined starter motor and alternator is operating as an alternator, to establish conduction times of the first and second power switch means in accordance with a vehicular electrical load present at the direct current energy source.

10. The apparatus of claim 9, wherein the phase angle control means comprises level detection means coupled to the stator winding, delay means having an enabling input coupled to an output of the level detection means, and enabling means coupled to an output of the delay means and operative, upon receipt of an enabling signal from the delay means to render one of the first and second power switch means conductive.

11. The apparatus of claim 10, further comprising regulator control means coupled to the delay means, operative in the alternator mode to vary a delay time provided by the delay means as a function of a predetermined engine system parameter.

12. The apparatus of claim 11, wherein the delay means comprises variable counting means operative to count for a period of time determined by a number supplied to the counting means by the regulator control means.

13. The apparatus of claim 12, wherein the predetermined engine system parameter comprises a difference between an alternator output voltage and direct current energy source output voltage.

14. The apparatus of claim 12, wherein the regulator control means includes an up/down counter having counter outputs coupled for supplying the number to the variable counting means, and comparator means coupled to the up/down counter and operative to cause the up/down counter to count up whenever the alternator output voltage is above a preselected limit and to count down whenever the alternator output voltage is below a preselected limit.

15. A combined starter motor and alternator for a vehicular engine system having a rotatable power shaft and source of direct current energy, the combined starter motor and alternator comprising:
support means coupled to and rotatable by the power shaft and carrying a plurality of permanent magnets lying in a plane substantially perpendicular to a longitudinal axis of the power shaft;
magnetic flux return means spaced from the support means axially along the power shaft axis and coupled to the power shaft for rotation therewith;

stator means surrounding the power shaft and positioned between the support means and the magnetic flux return means, the stator means including at least one phase winding comprised of stranded conductive wire, at least a portion of the turns of the stranded winding lying in planes substantially perpendicular to the shaft axis, the stranded winding undulating radially inwardly and outwardly of the axis of the shaft;

means for directing electrical current from the direct current energy source through the phase winding so as to produce mechanical torque on the shaft in a starter motor mode of operation; and conduction control means for regulating alternator output current from the phase winding when in an alternator mode of operation.

16. The combined starter motor and alternator of claim 15, wherein the stator means includes a non-magnetic body encapsulating the phase winding.

17. The combined starter motor and alternator of claim 15, wherein the stranded wire phase winding comprises winding turns in the stator means stacked both axially along and radially about the power shaft axis.

18. The combined starter motor and alternator of claim 16, wherein the stranded wire phase winding comprises winding turns in the non-magnetic body stacked both axially along and radially about the power shaft axis.

19. The combined starter motor and alternator of claim 15, wherein the means for directing electrical current comprises:

first silicon controlled rectifier switch means coupled between the direct current energy source and a first end of the phase winding;

second silicon controlled rectifier switch means coupled between the direct current energy source and a second end of the phase winding;

third switching means coupled between ground potential and the first end of the phase winding;

fourth switching means coupled between ground potential and the second end of the phase winding; and control means for alternatively (a) rendering the first and fourth switching means conductive so as to establish current flow through the stator winding in a first direction, and (b) rendering the second and third switching means conductive so as to establish current flow through the stator winding in a second direction.

20. The combined starter motor and alternator of claim 19, wherein the conduction control means comprises:

first power switch means coupled between the first end of the phase winding and the direct current energy source;

second power switch means coupled between the second end of the phase winding and the direct current energy source;

the conduction control means operative, whenever the combined starter motor and alternator is operating as an alternator, to establish conduction times of the first and second power switch means in accordance with a vehicular electrical load present at the direct current energy source.

21. An electrical machine for use as a combined starter motor and alternator positioned about a crankshaft of a vehicular engine having a source of direct current energy, the machine comprising:

a support plate surrounding and coupled for rotation with the crankshaft, the support plate having an outer annular portion for carrying a plurality of permanent magnets lying in a plane substantially perpendicular to and surrounding a longitudinal axis of the crankshaft;

a magnetic flux return plate surrounding the crankshaft and coupled for rotation therewith, the flux return plate having an outer annular portion facing the outer annular portion of the support plate and spaced therefrom axially along the crankshaft axis to define an annular channel between the support plate and the magnetic flux return plate;

a stationary stator assembly having a non-magnetic body, an annular disk-shaped portion of which is positioned about the crankshaft in the annular channel and including at least one phase winding of stranded conductive wire embedded in the non-magnetic body, at least portions of turns of the stranded wire phase winding undulating radially inwardly and outwardly of the crankshaft axis in the annular disk height-shaped portion;

means for directing electrical current from the direct current energy source in alternating opposite directions through the phase winding in a starter motor mode of operation of the electrical machine; and conduction phase angle control means for regulating alternator output current from the phase winding in an alternator mode of operation of the electrical machine.

22. The electrical machine of claim 21, wherein the means for directing electrical current comprises:

a first silicon controlled rectifier (SCR) coupled between the direct current energy source and a first end of the phase winding;

a second SCR coupled between the direct current energy source and a second end of the phase winding;

first power transistor means coupled between ground potential and the first end of the phase winding;

second power transistor means coupled between ground potential and the second end of the phase winding;

a Hall-effect switch mounted adjacent the phase winding in the stator assembly housing, the Hall-effect switch having first and second outputs respectively indicative of first and second magnetic polarities of the phase winding;

first means, coupled to the first output of the Hall-effect switch, for rendering the first SCR and the second power transistor means conductive so as to establish current flow through the phase winding in a first direction whenever the first magnetic polarity is indicated; and second means, coupled to the second output of the Hall-effect switch, for rendering the second SCR and the first power transistor means conductive so as to establish current flow through the phase winding in a second direction whenever the second magnetic polarity is indicated.

23. The electrical machine of claim 21, wherein the conduction phase angle control means comprises:

first output power switch means coupled between the first end of the phase winding and the direct current energy source;

second output power switch means coupled between the second end of the phase winding and the direct current energy source;
level detection means coupled to the phase winding;
a programmable counter having an enabling input coupled to an output of the level detection means;
regulator control means coupled to the programmable counter for supplying a predetermined count value thereto; and
enabling means coupled to an output of the programmable counter and to the first and second power switch means, operative, upon the completion of count values specified by the regulator control means, to render one of the first and second power switch means conductive.

* * * * *